Nov. 11, 1969  L. M. CARREIRA ET AL  3,477,934
IMAGING PROCESS
Filed June 29, 1966  4 Sheets-Sheet 1

INVENTORS.
LEONARD M. CARREIRA
VSEVOLOD TULAGIN
BY
ATTORNEYS

INVENTORS.
LEONARD M. CARREIRA
VSEVOLOD TULAGIN

ATTORNEYS

INVENTORS.
LEONARD M. CARREIRA
VSEVOLOD TULAGIN
BY
ATTORNEYS 3,477,934
IMAGING PROCESS
Leonard M. Carreira, Webster, and Vsevolod Tulagin, Rochester, N.Y., assignors to Xerox Corporation, Rochester, N.Y., a corporation of New York
Filed June 29, 1966, Ser. No. 561,587
Int. Cl. C23b 13/00; B01k 5/00
U.S. Cl. 204—181                                                   15 Claims

ABSTRACT OF THE DISCLOSURE

An electrophoretic imaging process is disclosed in which an electrostatic charging step is performed with a corotron to leave a uniform charge on the surface of one of the electrodes.

---

This invention relates in general to imaging systems and, more specifically, to an improved electrophoretic imaging system.

There has been recently developed an electrophoretic imaging system capable of producing color images which utilizes electrically photosensitive particles. This process is described in detail and claimed in Patent Nos. 3,384,488; 3,384,566 and 3,383,993, all issued on May 21, 1968. In such an imaging system, variously colored light absorbing particles are suspended in non-conductive liquid carrier. The supension is placed between electrodes, one of which is at least partially transparent, and subjected to a potential difference while the suspension is exposed to an image through partially transparent electrode. As these steps are completed, selective particle migration takes place in image configuration providing a visible image at one or both of the electrodes. Where the positive image is formed on a conductive transparent electrode, ordinarily the image must be transferred to a receiving sheet so that the relatively expensive conductive transparent electrode may be reused. An essential component of the system is the suspended particles which must be electrically photosensitive and which apparently undergo a net change in charge polarity upon exposure to activating electromagnetic radiation, through interaction with one of the electrodes. In a monochromatic system, particles of a single color are used, producing a single colored image similar to conventional black-and-white photography. In a polychromatic system, the images are produced in natural color because mixtures of particles of two or more different colors which are each sensitive to light of a specific wave-length or narrow range of wave-lengths are used. Particles used in this system should have both intense pure colors and be highly photosensitive.

After the exposure and particle migration steps are completed, the electrodes are separated and the carrier liquid is allowed to evaporate. This leaves images on one or both of the electrodes made up of selectively deposited particles. Since these electrodes may consist of relatively expensive materials or may be integral parts of the imaging apparatus, it is generally required that the images be transferred to a receiving sheet, fixed thereon for later viewing use. This permits the original electrodes to be reused immediately to produce further images.

In order to produce an electric field across the suspension during the imaging process, the transparent electrode generally has a conductive surface, such as tin oxide and the other electrode has a relatively insulating surface behind which is a second conductive electrode. This process is capable of producing excellent color images. However, it would be desirable to simplify the process by eliminating the need to transfer images produced from an electrode to a receiving sheet. But, it is not generally possible to fix a formed image directly on the conductive transparent electrode since these materials are expensive and must be reused to provide reasonable economy in the imaging process. Also, these materials, e.g., tin oxide coated glass, are often not suitable for later handling and use even if it is possible to fix an image to the surface thereof. Also, in a reusable system, there are problems in balancing the requirements of conductivity and transparency in an electrode. Often, materials which impart conductivity to the electrode impair transparency. Thus, there is a continuing need for improved electrode materials for use in electrophoretic imaging processes of the sort described above.

In some instances it may be preferable to transfer the reformed image from the electrode surface to a receiving sheet. For example, where the electrode upon which the image is formed is transparent, it may be desirable to transfer the formed image to an opaque viewing sheet such as paper. The preferred method of transferring the images is to do so electrophoretically. In this transfer process, immediately after the imaging process, the electrodes are separated and a receiving sheet is brought into contact with the imaged electrode. The imaging surface is illuminated with white light, causing an electrophoretic migration of the image particles to the receiving sheet. The receiving sheet is then stripped away, carrying with it the image. Where the transfer step is carried out immediately after the imaging step, effective transfer of the image to the receiving sheet is obtained. Where there is a delay of more than a few seconds, however, even with the application of additional carrier liquid to the image, the quality of the transferred image is drastically reduced. Density and color balance are degraded and irregularities or blotches are observed in the image areas.

Any time variation between image formation and image transfer introduces variations into the quality of the final image. Simple non-automated copying devices where the various steps are carried out more or less by hand, the timing of the imaging and transfer steps will inherently vary. Thus, there is a continuing need for an improved method of transferring electrophoretic images to receiving sheet at varying times after image formation while maintaining uniform image quality.

It is, therefore, an object of this invention to provide an electrophoretic imaging system overcoming the above noted disadvantages.

It is another object of this invention to provide an electrophoretic imaging system capable of producing final images of uniform high quality.

It is another object of this invention to provide an improved method of transferring electrophoretic images to receiving sheets.

It is another object of this invention to improve the uniformity of final images produced in an electrophoretic imaging system.

It is still another object of this invention to provide an electrophoretic imaging system which does not require conductive transparent electrodes.

It is still another object of this invention to provide an extremely simple, non-complex electrophoretic imaging system.

The foregoing objects and others are accomplished in accordance with this invention by providing in an electrophoretic imaging process wherein the layer of suspension is subjected to an applied electric field between two electrodes, at least one of which is transparent, while an image is projected onto the suspension through said transparent electrodes to form an image on one of said electrodes, the step of electrostatically charging at least one of said elements, namely an electrode, the suspension, or the formed image.

In one embodiment of this invention, neither of the two electrodes is conductive and the electrostatic charging step is performed on one of the electrodes immediately before the suspension is placed between the electrodes. The second electrode is held at a potential opposite in sign to that of the electrostatic charge placed on the first electrode while an image is projected on the suspension through the transparent electrode. The electric field between the charged first electrode and the second electrode in combination with the photosensitive particles in the suspension enables an electrophoretic migration to take place in image configuration. The image formed on one electrode consists of particles loosely bonded to the surface. This image may be fixed by any conventional method. This imaged electrode may be removed from the system for later use or viewing. Since this electrode may be any suitable insulating material, it may be easily and quickly replaced with a fresh sheet and the imaging steps repeated.

In another embodiment of this invention, an electrophoretic image is formed on the injecting electrode, the formed image surface is electrostatically charged, and the image is transferred electrophoretically to a receiving sheet. Where the formed image is electrostatically charged before the transfer step, the quality of the transferred image is consistently high despite varying or extended periods between the image formation and the image transfer steps.

In a further embodiment of this invention, the particle suspension is coated onto one electrode and the suspension is electrostatically charged just before the second electrode is brought into contact with the suspension and during the imaging step. The second electrode is held at a potential opposite in sign to that of the electrostatic charge imposed on the suspension. This charging step has been found to increase image density and uniformity.

In a further embodiment of this invention, the two electrodes are brought into contact with the particle suspension before electrophoretic imaging. The surface of the blocking electrode not in contact with the suspension is then electrostatically charged. This eliminates the requirement for a power supply to impose a constant potential on the back of blocking electrode during imaging. This simplifies the equipment necessary for electrophoretic imaging without lowering image quality.

The uniform electrostatic charging of one or more elements of the electrophoretic imaging system as described in the different embodiments above, may be performed by any conventional means. Charging by corona discharge is preferred since a uniform charge of the desired potential may be simply and easily laid down on a surface without physical contact with said surface. Charging by corona discharge is described in detail by Carlson in U.S. Patent 2,588,699 and Walkup in U.S. Patent 2,777,557. Any other suitable charging methods may be used where desired. For example, where a surface such as the injecting or blocking electrode will not be harmed by physical contact therewith, the surface may be charged by rubbing a triboelectrically suitable material thereagainst, as described by Carlson in U.S. Patent 2,297,691.

Figure 3:
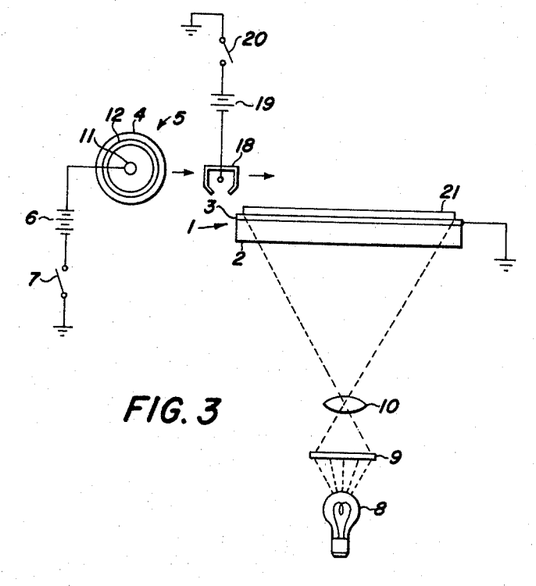
FIG. 3 shows an exemplary electrophoretic imaging system in which an insulating injecting electrode is uniformly electrostatically charged before imaging.

Images may be formed by the above described processes from suspensions of any suitable photosensitive particles. The photosensitive particles may, for example, comprise the materials disclosed in Patent No. 3,383,993 issued on May 21, 1968. Where a monochromatic image is to be formed, the particles will be of a single color. Where polychromatic images are to be formed, particles of two or more colors may be used. For example, for subtractive color formation, the particles will ordinarily be magenta, cyan and yellow. Any suitable insulating liquid may be used as the carrier for the photosensitive particles and the imaging suspension. Typical insulating carrier liquids include: decane, dodecane, molten paraffin, molten beeswax or other molten thermoplastic materials, Sohio Odorless Solvent 3440 (a kerosene extraction), Isopar G (a long-chain saturated aliphatic hydrocarbon) and mixtures thereof. The blocking electrode, the surface of the transfer rollers, and the injecting electrode as shown in FIG. 3, may comprise any suitable insulating material. Typical materials having suitable insulating properties include: baryta paper (paper coated with barium sulphate in a gelatin binder), cellulose acetate or polyethylene coated papers, polyethylene terephthalate, polytetrafluoroethylene, polystyrene, polyamides, etc. In an embodiment such as that shown in FIG. 5, the blocking electrode may be transparent and the imaging suspension may be exposed through the blocking electrode rather than through the injecting electrode.

The advantages of utilizing uniform electrostatic charging in an electrophoretic imaging system will become further apparent upon consideration of the following detailed disclosure of the invention, especially when taken in conjunction with the accompanying drawings wherein.

The same numbers are used to designate similar elements throughout the various figures.

Figure 1:
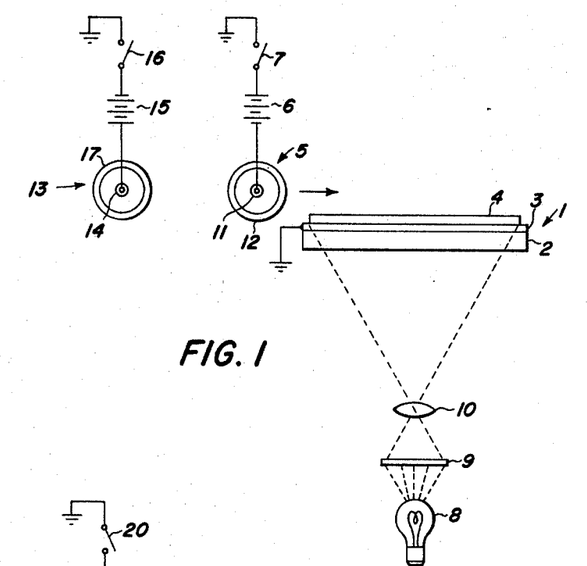
FIG. 1 shows a simple schematic representation of an electrophoretic imaging system which does not include the electrostatic charging improvement of this invention.

Referring now to FIG. 1, there is shown an exemplary embodiment of a system for forming a photoelectrophoretic image on one of the imaging electrodes and then transferring the formed image to a receiving sheet. In FIG. 1 there is shown a transparent electrode generally designated 1, which, in this exemplary instance, is made up of a layer of optically transparent glass 2 overcoated with a thin, optically transparent layer 3 of tin oxide, commercially available under the name NESA glass. This electrode shall hereafter be referred to as the "injecting electrode." Coated on the surface of injecting electrode 1 is a thin layer 4 of finely divided photosensitive particles, dispersed in an insulating liquid carrier. The term "photosensitive" for the purposes of this application refers to the properties of a particle which once attracted to the injecting electrode, will migrate away from it under the influence of an applied electric field when it is exposed to actinic electromagnetic radiation. For a detailed theoretical explanation of the apparent mechanism of operation of the imaging process, see the above-mentioned Patent Nos. 3,384,488, 3,384,566 and 3,383,993, the disclosures of which are incorporated herein by reference. Adjacent to the liquid suspension 4 is a second electrode 5, hereinafter called the "blocking electrode," which is connected to one side of a potential source 6 through a switch 7. The opposite side of potential source 6 is connected to ground, as is injecting electrode 1 so that when switch 7 is closed, an electric field is applied across the liquid suspension 4 between electrodes 1 and 5.

During the imaging operation, blocking electrode 5 is moved across the surface of injecting electrode 1. An image projector made up of a light source 8, a transparency 9, and a lens 10 is provided to expose the liquid suspension 4 to a light image of the original transparency 9 to be reproduced. Electrode 5 is made in the form of a roller having a conductive central core 11 connected to the potential source 6. The core is covered with a layer of a blocking electrode material 12 which may be baryta paper or other suitable material. An image is formed from the particle suspension by exposing the particle suspension to the image to be reproduced while a potential is applied across the blocking and injecting electrodes by closing switch 7. Roller 5 is caused to roll across the top surface of injecting electrode 1 with switch 7 closed during the period of image exposure. The light exposure causes particles originally attracted to electrode 1 to migrate through the carrier liquid and adhere to the surface of the blocking electrode 5, leaving behind a pigment image on the injecting electrode surface which is a duplicate of the original transparency 9. Preferably, the particulate image formed on the surface of injecting electrode 1 is transferred to a receiving sheet and fixed thereon for further use and viewing. As described in copending application Ser. No. 542,050 filed Apr. 2, 1966, a transfer roller may be utilized to receive the image from the injecting electrode surface. Such a transfer roller is shown at 13. Transfer roller 13 has the same general structure as blocking electrode 5. A conductive core 14 is connected to ground through a potential source 15 and switch 16. The surface of the transfer roller comprises any suitable material 17, such as baryta paper, for receiving the image. The potential imposed on the transfer roller is opposite in sign to that used on the blocking electrode during the imaging step. While transfer roller 13 is passing across the surface of injecting electrode 1, the image areas are light exposed, either to white light, suitably filtered white light or to the original image projected through transparency 9. Where desired, the surface of the particulate image on the injecting electrode may be moistened with additional carrier liquid to improve the transfer step. Where transfer roller 13 is passed across the surface of injecting electrode 1 immediately after the image is formed, effective transfer of a good quality image to the surface of roller 13 is accomplished. However, if an appreciable delay of more than a few seconds occurs between the imaging and the transfer steps, the quality of the transferred image decreases.

Images produced by systems of the sort schematically shown in FIG. 1 are generally of excellent quality. However, the system as shown in FIG. 1 requires a conductive transparent injecting electrode which is generally rather fragile and expensive and, thus, necessitates the transfer of the image to a receiving sheet for further use in viewing. Also, image transfer must be accomplished immediately after image formation in order to obtain a good image on the receiving sheet. This imaging system may be substantially improved by the use of electrostatic charging of various elements of the system during the imaging and transfer operation. FIGS. 2–7 show various embodiments of this improved electrophoretic imaging system.

Figure 2:
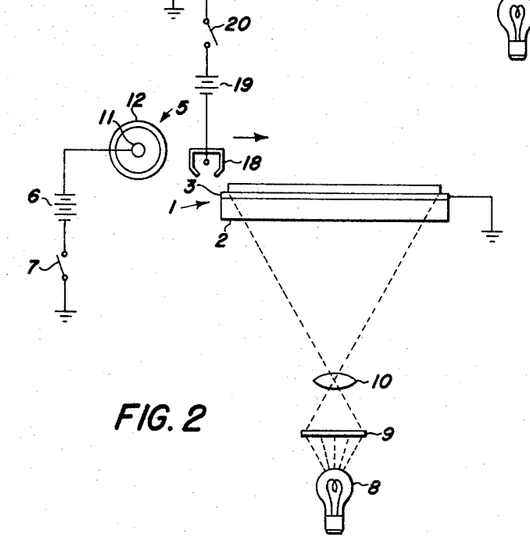
FIG. 2 shows an exemplary electrophoretic imaging system in which the suspension is electrostatically charged before imaging.

Referring now to FIG. 2, there is shown a modification of the system of FIG. 1 in which an image of improved density and color balance is formed on the injecting electrode surface. In this instance, however, a corona discharge unit 18 is arranged to pass across the surface of the injecting electrode immediately prior to the imaging step. The corona head 18 is connected to ground through potential source 19 and switch 20. Since injecting electrode 1 is also grounded, as corona unit 18 passes across the surface of the injecting electrode with switch 20 closed, a uniform electrostatic charge is deposited on the surface of suspension 4. This electrostatic charge is of the same sign as the potential imposed on the blocking electrode when it passes across suspension 4 during the imaging step. It appears that this preliminary electrostatic charge enhances the ability of light-struck particles to migrate, thus resulting in an image of improved density and color balance.

FIG. 3 shows a further embodiment of the use of uniform electrostatic charging in photoelectrophoretic imaging systems. This embodiment differs from that shown in FIG. 1 in that the formed image is fixed directly onto a removable injecting electrode, thus eliminating the requirement for a transfer roller 13. In this embodiment, the injecting electrode 1 includes a sheet of insulating material 21 which is uniformly electrostatically charged as by corona unit 18 immediately before the imaging operation. Insulating sheet 21 may comprise any partially transparent insulating material, such as Mylar (polyethylene terephthalate.) The electrostatic charge placed on the surface of sheet 21 is opposite in sign to that imposed on the conductive center of blocking electrode 5. In the system shown in FIG. 3, the particulate suspension 4 is shown as coated on the surface of blocking electrode 5. While this is often convenient, the suspension may be coated on the surface of sheet 21 immediately after its surface has been charged by corona means 18. During the imaging step, as blocking electrode 5 passes across the surface of sheet 21, a positive image corresponding to transparency 9 is formed on the surface of sheet 21. This image may be fixed by any convenient means, such as by a binder included in the particle carrier liquid, by laminating a second sheet over the formed image, by spraying with a suitable lacquer, or by a thermo-adhesive layer on the surface of sheet 21 such as is described in copending application, Ser. No. 459,860, filed June 28, 1965. The embodiment shown in FIG. 3 has the distinct advantage over that shown in FIG. 1 in that the image need not be transferred to a receiving sheet. Any transfer step necessarily involves some loss of image quality. Also, this system lends itself to rapid production of multiple copies in that one need only replace imaged sheet 21 with another sheet and recoat suspension 4 onto electrode 5 to be ready for subsequent imaging.

Figure 4:
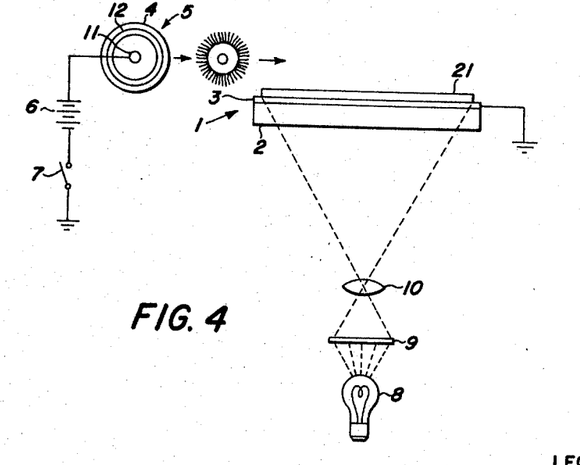
FIG. 4 shows an alternative method of uniformly electrostatically charging the injecting electrode as in FIG. 3.

FIG. 4 shows the embodiment of FIG. 3 with an alternative method of charging the insulating injecting electrode surface. Here, the insulating sheet 21 is charged by means of a rotating fur brush 22 which is passed across the surface of sheet 21 immediately before imaging. Such triboelectric charging is described in detail by Carlson in U.S. Patent 2,297,691. The sheet 21 and brush 22 materials are selected so as to triboelectrically charge the surface of sheet 21 to a potential having a sign opposite to that imposed on the core of blocking electrode 5. This alternative has the advantage in simplifying the system by eliminating the need for corona head 18, power supply 19, and switch 20.

Figure 5:
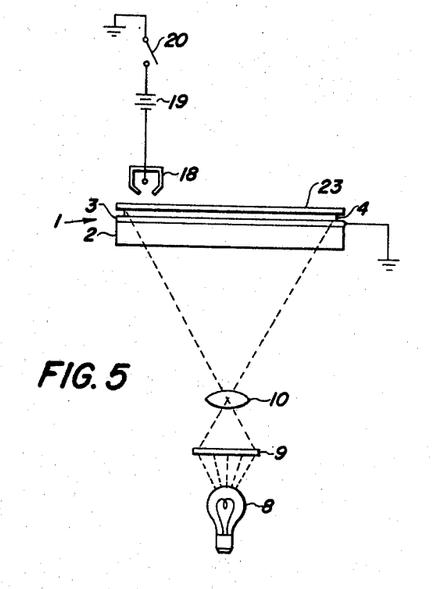
FIG. 5 shows an exemplary electrophoretic imaging system in which the back of the blocking electrode is uniformly electrostatically charged.

FIG. 5 shows a further embodiment of electrophoretic imaging utilizing electrostatic charging in which the blocking electrode material 12 as shown in FIG. 1 is placed in direct contact with the particles suspension 4 and power supply 6 connected to conductive backing is replaced with uniform electrostatic charging of the upper surface of the blocking electrode. In this embodiment, the particle suspension 4 is coated on the surface of injecting electrode 1 as in the embodiment of FIG. 1. A projection system comprising lamp 8, transparency 9 and lens 10 is positioned so as to project an image on suspension 4. In this embodiment a sheet of blocking electrode material 23 is placed over the suspension 4 and the upper surface of sheet 23 is uniformly electrostatically charged by means of corona head 18 supplied with a potential by power supply 19 through switch 20. An electric field is imposed on the suspension since the injecting electrode is grounded.

Sheet 23 may comprise any suitable insulating material, such as baryta paper, Mylar (polyethylene terephthalate) etc. In this system the back of sheet 23 is charged, and the suspension is exposed to an image. Sheet 23 is then removed, leaving a positive image conforming to the original on the surface of the injecting electrode. When it is desired to transfer this image to a receiving sheet, a second insulating sheet 23 is placed over the formed image and corona means 18 is again passed across the back of sheet 23 to uniformly electrostatically charge it. However, for the transfer operation the sign of the electrostatic charge placed on 23 is opposite to that used during the imaging step. When this second sheet 23 is stripped from injecting electrode 1, the formed image will be found to have transferred to sheet 23 and may be fixed thereon by any suitable method. This embodiment is a simplification of that shown in FIGURE 1 in that the multilayered roller electrode 5 is replaced by a single sheet 23 and a corona discharge unit.

Figure 6:
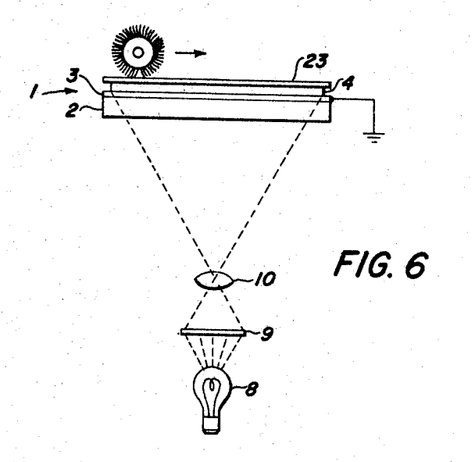
FIG. 6 shows an alternative method of charging the blocking electrode in the configuration shown in FIG. 5.

FIGURE 6 shows an embodiment generally similar to that of FIGURE 5 in which the back of sheet 23 is charged triboelectrically by means of a rotating fur brush 22 instead of the corona discharge unit. Where a second transfer step is desired as described above in the description of the embodiment of FIGURE 5, it may be desirable to select the fur brushes used during the imaging step and during the transfer step so as to triboelectrically charge the surface of sheet 23 to potentials of opposite sign during imaging and transfer steps. This system is a further simplification of that shown in FIGURE 5 in that corona charging unit 18, power supply 19, and switch 20 are replaced by a simple rotating fur brush.

Figure 7:
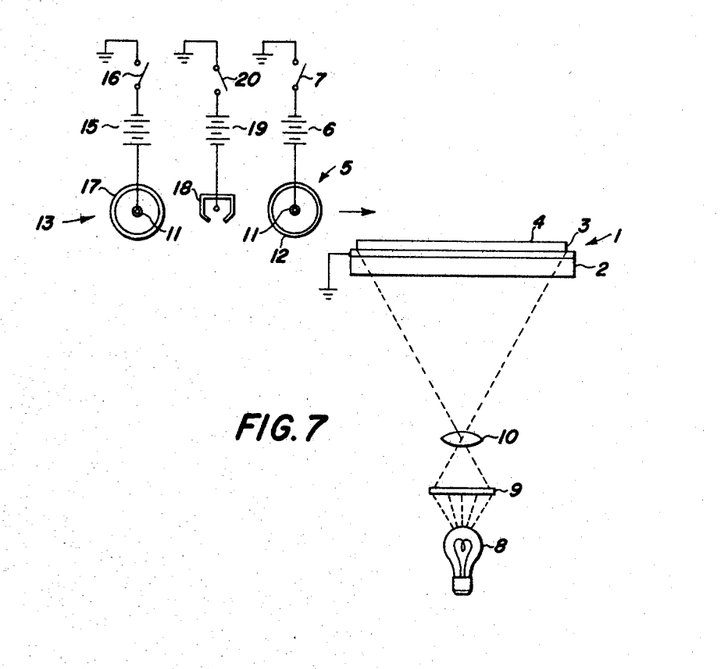
FIG. 7 shows an exemplary method for transferring an electrophoretic image wherein the formed image is electrostatically charged before transfer.

FIGURE 7 shows an embodiment of the system shown in FIGURE 1 in which transfer of a formed electrophoretic image is improved. The system as used in this embodiment is generally the same as that shown in FIGURE 1, except that a corona discharge unit comprising a corona head 18, potential source 19 and switch 20 is positioned between the blocking electrode roller 5 and the transfer roller 13. After blocking electrode roller 5 has passed across the surface of the injecting electrode during the image forming step, corona head 18 is passed across the formed image to electrostatically charge the surface of the formed image to a potential opposite to that imposed on the transfer roller. Where transfer takes place within a few seconds after imaging, the electrostatic charging of the formed image results in somewhat improved density in the transferred image, i.e., more complete transfer of particles from the surface of the injecting electrode 1 to transfer roller 13. Where there is delay of more than a few seconds between imaging and transfer, the image quality falls off drastically where the formed image is not electrostatically charged before transfer. However, where the formed image is charged before transfer, quality of the transferred image remains high despite substantial delays between imaging and transfer. Where there is appreciable delay between image formation and transfer, it may be desirable to moisten the surface of the formed image with a small amount of the carrier liquid.

Good quality images may be produced with voltages imposed on the blocking electrode and on the transfer roller in the range from about 300 to 5000 volts in the various embodiments of this invention. Images of high quality may be produced with potentials of about 2000–4000 volts without danger of undesirable air ionization. Therefore, a potential of about 3,000 volts is preferred. A corona discharge voltage may be in the range from about 4,000 to 8,000 volts. A preferred corona voltage is about 6,000 volts since this results in most effective image formation and transfer. Where the various elements are charged triboelectrically, the charging member may comprise any suitable material which is spaced from the material to be charged on the triboelectric series such as to produce a charge on the element of the desired sign.

The following examples further specifically define the present invention with respect to the use of uniform electrostatic charging in electrophoretic imaging system. Parts and percentages are by weight unless otherwise indicated. Examples below are intended to illustrate various preferred embodiments of the invention and of the different embodiments described above.

All the following examples are carried out in apparatus of the general type illustrated in the various figures. Where blocking electrodes in roller form or transfer rollers are used, the rollers are approximately 2½″ in diameter and are moved across the plate surface at about 1.5 centimeters per second. In each case, the injecting electrode surface employed is roughly 3″ square and is exposed with a light intensity of about 8,000 ft. candles as measured on the uncoated injecting electrode surface. Where a monochromatic image is to be produced, the suspension is exposed to an image by means of a conventional black and white transparency. Where a polychromatic image is to be produced, the suspension is exposed to an image by means of a "Color" transparency. All pigments which have a relatively large particle size as received commercially or as made are ground in a ball mill for about 48 hours to reduce their size to provide a more stable dispersion and to improve the resolution of final images.

Example I

This example is performed with an imaging system of the sort shown in FIGURE 1. About 8 parts of 2,4,6-tris (3 pyrenylazo) phloroglucinol, prepared as described in Patent No. 3,384,632 issued on May 21, 1968 is mixed with about 100 parts Sohio Odorless Solvent 3440, a kerosene fraction. This dispersion is coated onto the NESA glass substrate. A negative potential of about 2,500 volts is imposed on the roller electrode during exposure. After exposure, an image corresponding to the original is seen on the NESA surface. Immediately after image formation a transfer roller having a baryta paper surface and subjected to a positive potential of about 2,000 volts is passed across the NESA glass while the original image is projected onto the NESA surface. The image is transferred to this roller surface from the NESA electrode. The black-on-white image produced is of good quality. A small proportion of the black particles remain on the NESA surface must be cleaned therefrom before subsequent imaging operations.

Example II

The imaging and transfer steps of Example I are repeated except that immediately prior to imaging a corona discharge unit is passed across the particle suspension, depositing a uniform positive charge of about 6,000 votls on the suspension. The imaging and transfer steps are then performed as in Example I. The resulting image is of excellent quality and somewhat greater density than that produced in Example I.

Example III

The imaging and transfer steps of Example I are repeated, except that the particle suspension compries about 3 parts Algol yellow GC, 1,2,5,6-di(c,c'-diphenyl)-thiazoleanthraquinone, C.I. No. 67,300 about 3 parts of a magenta pigment, Watchung Red B, 1-(4'-methyl-5'-chloroazo benzene-2'-sulfonic acid)-2-hydroxy - 3 - naphthoic acid, C.I. No. 15,865, available from E. I. du Pont de Nemours; and about 3 parts of a cyan pigment, Monolight Fast Blue GS, a mixture of alpha and beta metal-free phthalocyanine. The image produced is of good quality with good color balance.

Example IV

An image is formed as in Example III except that a corona discharge unit is passed across the suspension immediately before the image forming step to deposit a uniform electrostatic charge having a negative potential of about 6,000 volts on the suspension. The image is then formed and transferred to a receiving sheet as in Example III. The image is of excellent quality with density and color balance improved over the image formed in Example III.

Example V

This example uses an electrophoretic imaging system such as is shown in FIGURE 3. A ten micron sheet of Mylar, a polyethylene terephthalate film is placed in contact with the conductive surface of the injecting electrode. A suspension is formed comprising about 7 parts of 2,4,6-tris(3'-pyrenylazo)-phloroglucinol, in about 100 parts Isopar G, a long chain saturated aliphatic hydrocarbon available from The Humble Oil Company of New Jersey. This suspension is coated onto the blocking electrode surface to a thickness of about 5 microns. A corona charging unit is then passed across the Mylar sheet uniformly electrostatically charging the sheet to a negative potential of about 4,000 volts. Immediately thereafter the coated blocking electrode is passed across the Mylar sheet while subjected to a positive potential of about 2,500 volts. After the blocking electrode has passed across the Mylar sheet an image is seen on the Mylar sheet corresponding to the original. This image is of good quality, approximately equal to that produced in Example I.

Example VI

The imaging steps of Example V are repeated except that the Mylar sheet is charged by a fur brush such as is shown in FIGURE IV instead of by corona discharge. The surface electrostatic potential imposed on the Mylar sheet is negative and about 3,000 volts. The image is then formed as in Example V. An image of good quality corresponding to the original results on the Mylar sheet.

Example VII

The imaging steps of Example V are repeated except that the pigment suspension comprises about 3 parts of a yellow pigment, 8,13-dioxodinaphtho-(1,2-2',3)-furan-6-carbon-4''-methoxy anilide, prepared as described in copending application Ser. No. 421,377, filed Dec. 28, 1964; about 3 parts of a magenta pigment, Napthyl Red B, 1-(2'-methoxy-5' nitrophenylazo)-2 hydroxy - 3'' - nitro - 3-naphthanilide, C.I. No. 12,355; and about 3 parts of a cyan pigment, Cyan Blue GTNF, the beta form of copper phthalocyanine C.I. No. 74,160, dispersed in about 100 parts Sohio Odorless Solvent 3440. This suspension is coated onto the blocking electrode surface, the Mylar sheet is corona charged and the image is formed as in Example V. A full color image of good quality corresponding to the original is formed on the surface on the Mylar sheet. The charging and imaging steps of Example V are repeated, except that the insulating sheet on the NESA surface here is a 25 micron sheet of Lucite 44, a polymethylmethacrylate resin, and the pigment suspension comprises about 3 parts of a yellow pigment, Algol Yellow GC; about 3 parts of a magenta pigment, 2-(4'-toluazo)-4-isopropoxy-1-naphthol, prepared as described in copending application Ser. No. 445,240, filed Apr. 2, 1965; and about 3 parts of a cyan pigment, Diane Blue, 3,3'-methoxy-4,4'-diphenyl-bis(1'' - azo - 2''-hydroxy-3''-naphthanilide, C.I. No. 21,180, disbursed in about 100 parts Sohio Odorless Solvent 3440. This mixture is coated onto the baryta surface of the blocking electrode, the surface of the injecting electrode is corona charged to a negative potential of about 4,000 volts, and the blocking electrode is passed across the Lucite sheet under a positive potential of about 2,500 volts as in Example VII. A full color image conforming to the original is left on the surface of the Lucite sheet. A 5 micron sheet of Mylar film is laminated over the image surface to fix the image. The imaged sheet is then removed and replaced with a fresh Lucite film. The imaging mix is recoated on the blocking electrode surface and another image is produced as described above.

Example VIII

This example is performed with an electrophoretic imaging system of the sort shown in FIGURE 5. A pigment suspension comprising of about 7 parts of Monolite Fast Blue GS, dispersed in about 100 parts Sohio Odorless Solvent 3440 is coated onto the injecting electrode surface to a thickness of about 5 microns. A 10 micron Mylar sheet is then placed over the suspension in intimate contact therewith. The free surface of the Mylar sheet is then charged by corona to a negative potential of about 4,000 volts. A black-and-white image is projected onto the suspension through the injecting electrode. The Mylar sheet is then stripped from the suspension leaving an image on the injecting electrode corresponding to the original of satisfactory quality.

Example IX

This example uses an electrophoretic imaging system such as is shown in FIGURE 5. A pigment suspension is prepared comprising about 3 parts of a yellow pigment, Indofast Yellow Toner, flavanthrone, C.I. No. 70,600; about 3 parts of a magenta pigment, Quindo Magenta RV-6803, a substituted quinacridone; and about 3 parts of a cyan pigment, Monolite Fast Blue GS, a mixture of the alpha and beta forms of metal-free phthalocyanine, dispersed in about 100 parts Sohio Odorless Solvent 3440. This suspension is coated onto the injecting electrode surface to a thickness of about 5 microns. A sheet of baryta paper is then placed over the suspension with the coated paper surface in contact with the suspension. The back of the baryta paper is then uniformly electrostatically charged to a negative potential of about 2,000 volts by a corona discharge means. The suspension is then exposed to a full color image and the baryta paper is stripped away. A full color image corresponding to the original remains on the injecting electrode surface. A second sheet of baryta paper is then placed over the formed image and the back of the sheet is charged to a positive potential of about 2,000 volts while the image is again projected onto the injecting electrode surface. When the baryta paper is stripped away it is found that the image has transferred to the baryta paper surface.

Example X

The imaging steps of Example VIII are repeated, except that the back of the Mylar sheet is uniformly electrostatically charged by means of a rotating fur brush instead of by corona discharge. The triboelectric charging is to a negative potential of about 3,000 volts. The image is then formed and the electrodes separated as in Example VIII. An image of good quality corresponding to the original results.

Example XI

This example uses an electrophoretic imaging system such as is shown in FIGURE 7. About 8 parts of 2,4,6-tris (3'-pyrenylazo) phloroglucinol is mixed with about 100 parts Sohio Odorless Solvent 3440 and the suspension is coated onto the NESA glass substrate to a thickness of about 5 microns. A negative potential of about 2,500 volts is imposed on the blocking electrode during exposure. After exposure, an image corresponding to the original is seen on the NESA surface. Immediately after image formation a second roller having a baryta paper surface and subjected to a positive potential of about 2,000 volts is passed across the NESA surface while the original image is projected onto the NESA surface. The image is transferred to this roller surface from the NESA electrode. The black-on-white image produced is of good quality and corresponds to the original. A small amount of the black particles remain on the NESA surface and must be cleaned therefrom before subsequent imaging operations.

Example XII

The NESA electrode is coated, charged, and imaged as in Example XI. However, here immediately before the transfer roller passes across the NESA surface, a corona discharge means is passed across said surface under a negative potential of about 6,000 volts. The image produced on the transfer roller is of higher density than in Example XI and fewer pigment particles are left on the NESA glass electrode.

Example XIII

A dispersion is coated onto the NESA electrode and an image is produced on said electrode as in Example XI. About 5 minutes after the image is formed, the image is moistened with Sohio Odorless Solvent 3440 and the transfer roller is passed across the NESA electrode. Only a small proportion of the image particles transfer to the transfer electrode. The image transferred is of low density and very poor quality.

Example XIV

The NESA electrode is coated, charged and imaged as in Example XIII. Here, however, a corona discharge means is passed across the NESA electrode just before the transfer roller. The corona discharge means deposits a uniform negative potential of about 5,000 volts. The image transferred is of excellent quality, comparable to that produced in Example XI.

Example XV

About 3 parts of a yellow pigment, Algol Yellow GC, about 3 parts of a magenta pigment, Watchung Red B, and about 3 parts of a cyan pigment, Monolite Fast Blue GS are dispersed in about 100 parts Sohio Odorless Solvent 3440. This dispersion is coated onto the NESA electrode and an image is formed as in Example XI. About 5 minutes after the image is formed, the formed image is moistened with Sohio Odorless Solvent 3440 and a transfer roller is passed across the image under a positive potential of about 2,500 volts. The image transferred to the roller is of poor quality, of low density, and very poor color balance.

Example XVI

A dispersion is formed, coated onto the NESA electrode and an image is formed as in Example XV. About 5 minutes after the image is formed, the image is moistened with Sohio Odorless Solvent 3440 and a corona discharge means is passed across the formed image depositing a uniform negative potential of about 4,000 volts on the formed image. Immediately thereafter the transfer roller is passed across the formed image under a positive potential of about 2,500 volts. The image transferred to the transfer roller is of excellent quality, with much higher density and better color balance than that produced in Example XV.

Although specific components and proportions have been described in the above examples relating to various electrophoretic imaging systems utilizing uniform electrostatic charging of one element of the system, any of the materials as listed above may be used with similar results. In addition, other materials may be added to the particle suspension or to the various electrodes to synergize, enhance, or otherwise modify their properties.

Other modifications and ramifications of the present invention will occur to those skilled in the art upon a reading of the present disclosure. These are intended to be included within the scope of this invention.

What is claimed is:

1. An electrophoretic imaging process which comprises forming an image on an imaging structure comprising two electrodes, at least one of which is partially transparent, and a suspension positioned between said electrodes, said image being formed by projection through said partially transparent electrode, said process comprising the step of electrostatically charging at least one of said structure components.

2. The process of claim 1 wherein at least one of said electrodes is uniformly electrostatically charged before said suspension is placed therebetween.

3. The process of claim 1 wherein said suspension is formed on one of said electrodes, the free surface of said suspension is electrostatically charged, said electrodes are brought together while an image is projected on said suspension through said partially transparent electrode and said electrodes are separated, whereby an image is formed on at least one of said electrodes.

4. The process of claim 1 wherein an electric field is maintained across said electrodes while an image is projected on said suspension through said partially transparent electrode, said electrodes are separated leaving an image on at least one electrode conforming to the original, electrostatically charging said formed image, bringing a transfer sheet into contact with said formed image while an electric field is maintained between the image-bearing electrode and said transfer sheet whereby said formed image transfers to said transfer sheet.

5. An electrophoretic imaging process utilizing two electrodes, at least one of which is at least partially transparent, and a suspension therebetween, comprising the steps of:
   (a) electrostatically charging at least one of said suspension and two electrodes; and
   (b) exposing said suspension to an image through said transparent electrode with activating electromagnetic radiation while said suspension is subjected to an applied electric field, whereby an image made up of migrated particles is formed on at least one of said electrodes.

6. The process of claim 5 wherein said electrostatic charging is performed by passing a corona discharge unit maintained at a potential of from about 3,000 to about 8,000 volts across the element to be charged at least once.

7. An electrophoretic imaging process comprising the steps of:
   (a) providing a pair of electrodes, at least one of which is partially transparent;
   (b) coating onto one of said electrodes a suspension comprising photosensitive particles;
   (c) electrostatically charging said suspension to a potential of a first polarity; and
   (d) simultaneously exposing said suspension to an image through said transparent electrode with activating electromagnetic radiation and bringing said second electrode into contact with said suspension while subjecting the suspension to an applied electric field between said electrodes at a potential having a second polarity, whereby an image made up of migrated particles is formed on at least one of said electrodes.

8. The process of claim 7 wherein said suspension is charged by passing a corona discharge unit maintained at a potential of from about 3,000 to 8,000 volts across said suspension at least once.

9. An electrophoretic imaging process comprising the steps of:
   (a) providing a pair of non-conductive electrodes, at least one of which is partially transparent;
   (b) electrostatically charging a first electrode,
   (c) introducing a layer of suspension comprising photosensitive particles between said electrodes,
   (d) exposing said suspension to an image through said transparent electrode with activating electromagnetic radiation while the second electrode is held at a potential opposite in sign to the charge placed on said first electrode, whereby a pigment image made up of migrated particles is formed on at least one of said electrodes.

10. The process of claim 9 wherein said first electrode is electrostatically charged by passing a corona discharge unit maintained at a potential of from about 3,000 to 8,000 volts across said first electrode at least once.

11. An electrophoretic imaging process comprising the steps of:
    (a) providing a conductive electrode and a non-conductive electrode, at least one of which is at least partially transparent, (b) introducing a layer of a suspension comprising photosensitive particles between said electrodes, (c) electrostatically charging the free surface of said non-conductive electrode, (d) exposing said suspension to an image through said transparent electrode with activating electromagnetic radiation whereby an image made up of migrated particles is formed on at least one of said electrodes.

12. The process of claim 11 wherein said non-conductive electrode is electrostatically charged by passing a corona discharge unit maintained at a potential of from about 3,000 to 8,000 volts across the free surface of said non-conductive electrode.

13. An electrophoretic imaging process comprising the steps of:
   (a) providing a pair of electrodes having a suspension comprising photosensitive particles therebetween, at least one of said electrodes being at least partially transparent;
   (b) maintaining an electric field of a first polarity across said suspension between said electrodes while exposing said suspension to an image through said partially transparent electrode;
   (c) separating said electrodes, leaving a particulate image on at least one electrode;
   (d) electrostatically charging said particulate image to a potential having said first polarity;
   (e) contacting said particulate image with a transfer sheet while an electric field is maintained across said image between said transfer sheet and the image-bearing electrode, the potential on said transfer sheet having a second polarity; and
   (f) separating said transfer sheet from said electrode whereby said particulate image transfers to said transfer sheet.

14. An electrophoretic imaging process for imaging electrophoretic particle suspensions comprising the steps of
   providing a first electrode adapted to support the suspension;
   contacting the first electrode with a second electrode such that the suspension is maintained between said electrodes;
   applying an electric field between said electrodes;
   selectively exposing the area between the electrodes to particle activating electromagnetic radiation;
   applying an electrostatic charge to any of the electrodes and the suspension prior to applying the electric field and exposing to activating radiation.

15. The process of claim 14 wherein said application of an electrostatic charge occurs after application of an electric field and exposure and the image formed is then transferred to a transfer sheet.

References Cited

UNITED STATES PATENTS

| 3,332,328 | 7/1967 | Roth | 95—1.7 |
| 3,384,566 | 5/1968 | Clark | 204—181 |

JOHN H. MACK, Primary Examiner

A. C. PRESCOTT, Assistant Examiner

U.S. Cl. X.R.

96—1.7; 117—37; 204—299, 300